Sept. 18, 1962 ISAO YAMASHITA 3,054,888
PASSING LIGHT SYSTEM FOR MOTOR VEHICLES
Filed July 7, 1961
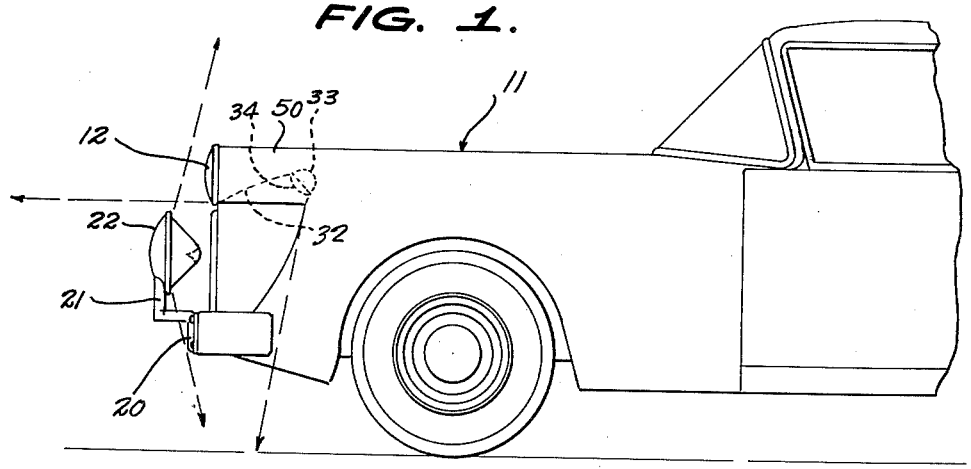
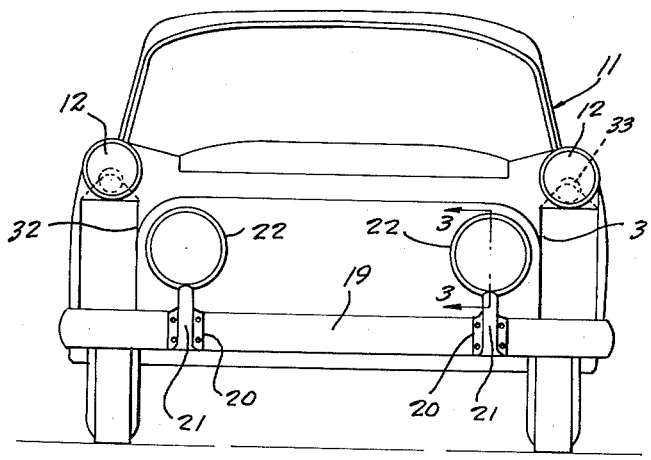
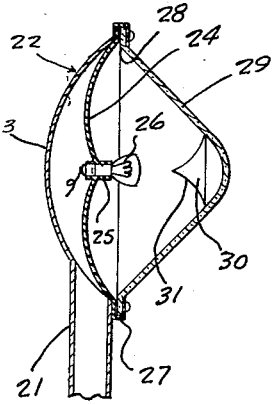
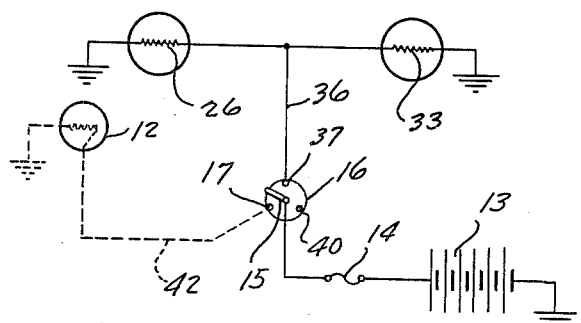
INVENTOR.
ISAO YAMASHITA,
BY
McMorrow, Berman & Davidson
ATTORNEYS.

3,054,888
PASSING LIGHT SYSTEM FOR MOTOR VEHICLES
Isao Yamashita, 2260 Yawata Kurihama,
Yokosuka, Japan
Filed July 7, 1961, Ser. No. 122,506
Claims priority, application Japan Feb. 2, 1961
1 Claim. (Cl. 240—7.1)

This invention relates to motor vehicle illumination systems, and more particularly to a passing light system for a motor vehicle to enable the operator of the vehicle to allow an oncoming vehicle to pass without glare from the operator's vehicle but enabling the operator to obtain an adequate view of the roadway ahead.

A main object of the invention is to provide a novel and improved passing light system for a motor vehicle which involves relatively simple components, which is easy to operate, and which completely eliminates glare from the vehicle's headlights so that an oncoming vehicle can safely pass same.

A further object of the invention is to provide an improved passing light system for a motor vehicle, said light system being easy to install, involving inexpensive components, and providing greatly increased safety in passing than is available with present equipment.

Further objects and advantages of the invention will become apparent from the following description and claims, and from the accompanying drawings, wherein:

FIGURE 1 is a side elevational view of the forward portion of a motor vehicle equipped with an improved passing light system according to the present invention.

FIGURE 2 is a front elevational view of the motor vehicle of FIGURE 1.

FIGURE 3 is an enlarged vertical cross sectional view taken substantially on the line 3—3 of FIGURE 2.

FIGURE 4 is a schematic electrical wiring diagram of the circuit connections employed in the passing light system provided on the vehicle of FIGURES 1 and 2.

Referring to the drawings, 11 generally designates a motor vehicle provided with the usual headlights 12 which are adapted to be energized in the usual manner from the motor vehicle battery 13. As shown in FIGURE 4, the ungrounded terminal of the battery 13 is connected through a fuse 14 to the pole 15 of a selector switch 16 which is engageable with a stationary contact 17 connected to the ungrounded terminals of the normal headlights 12 so as to energize the headlights when the pole 15 engages the contact 17.

Mounted on the front bumper 19 of the vehicle 11 are a pair of supporting brackets 20, 20, said brackets projecting forwardly from the bumper and being provided with upstanding arms 21. Secured on the top ends of the arms 21 are respective lamp assemblies 22, 22 which are thus located symmetrically at opposite sides of the vehicle longitudinal vertical plane and which are located at relatively low positions so that they cannot be viewed directly from the driver's position in the passenger compartment of the vehicle. As shown in FIGURE 1, the lamps 22 are mounted sufficiently low so that they will be obscured by the hood of the vehicle 11, with reference to the driver's position.

Each lamp assembly 22 comprises an opaque rearwardly concave front wall 23 in which is secured a rearwardly facing concave annular reflector 24 provided at its center with a lamp socket 25 in which a lamp 26 is mounted. The rim of the reflector 24 is seated in the flanged periphery 27 of the concave front wall 23, and also seated in the flanged periphery of said front wall is the rim 28 of a generally conical transparent forwardly concave lens 29. The rim element of the reflector 24 and the lens 29 are suitably clampingly secured in the peripheral flange 27 of wall 23 by suitable conventional fastening means.

Secured centrally in the lens 29 is a generally conical reflector 30 which is mounted with its apex coaxial with the assembly 22 and directed toward the lamp 26, as is clearly shown in FIGURE 3. The reflector 30 may be made of any suitable material provided with a reflective surface, and the annular reflecting surface of the member 30 is preferably forwardly concave, as shown at 31. Thus, the contour of the reflecting member 30 is such that light from the lens 26 will be reflected onto the front portion of the vehicle 11 immediately rearward of the associated lamp assembly 22, and also said front portion of the vehicle will be illuminated by direct light from lamp 26 passing through the portions of lens 29 around the central reflector member 30.

As previously mentioned, the lamp assemblies 22 are mounted in sufficiently low positions forwardly adjacent the front of the vehicle that light rays from the assemblies are cut off by the vehicle hood and cannot reach the vehicle operator.

The front portion of the vehicle 11 is formed beneath the housings 50, 50 of the normal headlamps 12, 12 with the downwardly and forwardly directed recesses 32, 32 in the ends of which are mounted the downwardly and forwardly directed auxiliary lamp assemblies 33, comprising lamp housings provided with front lenses 34 arranged to direct light rays generated in the assemblies 33 downwardly and forwardly from the front corner portions of the vehicle.

As will be readily apparent from FIGURES 1 and 2, the lamp assemblies 33 are completely shielded from direct view by pedestrians or by the drivers of oncoming vehicles, but provide illumination of the road surfaces in front of the vehicle.

FIGURE 4 shows a circuit diagram which includes the filaments of the lamps 26 and 33 connected in parallel between the vehicle ground and a wire 36. Wire 36 is connected to one of the stationary contacts 37 of the switch 16, so that the pole 15 may be moved into engagement with the switch contact 37, thus deenergizing the main headlamp 12 and energizing the passing lamp units 22 and 33.

It will be understood that although FIGURE 4 shows the lamp elements 26 and 33 as single elements, in actuality there are two of each of these elements, connected in parallel, one for each side of the vehicle.

In order to energize the passing lights, the vehicle operator merely rotates the switch arm 15 from contact 17 to contact 37, thus deenergizing the normal headlights 12 and energizing the auxiliary lamp units 22 and 33. This illuminates the roadway in front of the vehicle so that the operator can adequately view the roadway while at the same time an oncoming vehicle may pass without being annoyed by glare from the normal headlights 12 of the vehicle.

The switch 16 is provided with an additional stationary contact 40 which may be employed to energize auxiliary equipment from the vehicle battery 13, as required. The switch 16 is preferably mounted on the vehicle instrument panel within easy reach of the vehicle operator. The system may obviously be employed in conjunction with the normal type of vehicle dimming systems without requiring any modification of said systems, since it is merely necessary to connect the energizing wire 42 of the existing headlight system to the stationary contact 17 of the switch 16, instead of directly connecting wire 42 to the ungrounded terminal wire of the vehicle battery.

While a specific embodiment of an improved motor vehicle passing light system has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a motor vehicle, a passing lighting system comprising a pair of rearwardly directed frontlamp assemblies mounted on the forward portion of the vehicle and spaced sufficiently forwardly from the front of the vehicle to illuminate a substantial portion of said front of the vehicle, said front lamp assemblies each comprising an opaque front wall, a rearwardly facing annularly concave reflector secured to said front wall, a transparent, generally conical forwardly concave lens secured to said front wall and defining the rear wall of the assembly, a forwardly facing substantially conical reflector mounted centrally in said lens, and a lamp mounted on the center of said annularly concave reflector and extending into said lens, said lens being arranged to illuminate said front of the vehicle with the light rays from said lamp, a pair of downwardly and forwardly directed auxiliary lamp assemblies mounted on the front corner portions of the vehicle, said auxiliary lamp assemblies comprising a downwardly and forwardly directed concave housing containing a lamp and provided with a lens at its bottom, and means to simultaneously energize the lamps of said front lamp assembles and said auxiliary lamp assemblies.

References Cited in the file of this patent

UNITED STATES PATENTS

| | | |
|---|---|---|
| 1,581,066 | King | Apr. 13, 1926 |
| 1,676,463 | Ryan | July 10, 1928 |
| 1,686,859 | Huntington | Oct. 9, 1928 |
| 1,796,191 | Doll | Mar. 10, 1931 |
| 2,442,580 | Barlow | June 1, 1948 |
| 2,804,539 | Robbins | Aug. 27, 1957 |